(12) United States Patent
Telukunta et al.

(10) Patent No.: US 11,117,620 B2
(45) Date of Patent: Sep. 14, 2021

(54) VEHICLE BODY-IN-WHITE PANEL WITH REINFORCING AND ENERGY ABSORBING STRUCTURES

(71) Applicant: FORD GLOBAL TECHNOLOGIES, LLC, Dearborn, MI (US)

(72) Inventors: Rohit Telukunta, Troy, MI (US); Todd Mueller, Canton, MI (US); Dinesh Munjurulimana, South Lyon, MI (US); Anil Tiwari, Maastricht (NL); Jack Bekou, Windsor (CA); Steven Perucca, Warren, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 250 days.

(21) Appl. No.: 16/433,001

(22) Filed: Jun. 6, 2019

(65) Prior Publication Data

US 2020/0385062 A1 Dec. 10, 2020

(51) Int. Cl.
| | | |
|---|---|---|
| *B62D 21/15* | (2006.01) | |
| *B62D 25/04* | (2006.01) | |
| *B62D 29/00* | (2006.01) | |
| *B62D 65/14* | (2006.01) | |
| *B29C 45/14* | (2006.01) | |

(Continued)

(52) U.S. Cl.
CPC ........ *B62D 21/157* (2013.01); *B29C 45/0046* (2013.01); *B29C 45/02* (2013.01); *B29C 45/14311* (2013.01); *B29C 45/14631* (2013.01); *B62D 25/04* (2013.01); *B62D 29/004* (2013.01); *B62D 65/14* (2013.01); *B29C 2045/14327* (2013.01); *B29K 2705/00* (2013.01); *B29K 2995/0091* (2013.01); *B29L 2031/3005* (2013.01)

(58) Field of Classification Search
CPC . B60R 19/023; B60R 2019/026; B62D 25/04; B62D 21/157; B62D 29/004
USPC ...................................... 296/193.06
See application file for complete search history.

(56) References Cited

U.S. PATENT DOCUMENTS

| | | |
|---|---|---|
| 7,677,645 B2 | 3/2010 | Henkelmann |
| 9,969,434 B2 | 5/2018 | Baccouche et al. |

(Continued)

FOREIGN PATENT DOCUMENTS

| | | |
|---|---|---|
| DE | 102015115439 B3 | 1/2017 |
| EP | 1232935 A1 | 8/2007 |

(Continued)

OTHER PUBLICATIONS

Tiwari, A et al., "Light Metal-Plastic Body-in-White Solutions for Automotive", SABIC, 2017.

*Primary Examiner* — Joseph D. Pape
(74) *Attorney, Agent, or Firm* — David Coppiellie; Carlson, Gaskey & Olds

(57) ABSTRACT

An apparatus, according to an exemplary aspect of the present disclosure includes, among other things, a body-in-white member having an inboard side and an outboard side, a reinforcing structure molded on the inboard side, and an energy absorbing structure molded on the outboard side. A method according to an exemplary aspect of the present disclosure includes, among other things, providing a body-in-white member having an inboard side and an outboard side, molding a reinforcing structure on the inboard side, and molding an energy absorbing structure on the outboard side.

20 Claims, 7 Drawing Sheets

(51) Int. Cl.
  *B29C 45/00*   (2006.01)
  *B29C 45/02*   (2006.01)
  *B29K 705/00*   (2006.01)
  *B29L 31/30*   (2006.01)

(56) References Cited

U.S. PATENT DOCUMENTS

2011/0206890 A1\* 8/2011 Belpaire ................ B62D 21/09
                                                        428/68
2019/0016392 A1\* 1/2019 Lee ........................ B62D 27/02
2019/0276088 A1\* 9/2019 Onishi ................... B62D 25/04

FOREIGN PATENT DOCUMENTS

EP          2388123 A1   11/2011
WO       2018189635 A1   10/2018

\* cited by examiner

VEHICLE BODY-IN-WHITE PANEL WITH REINFORCING AND ENERGY ABSORBING STRUCTURES

TECHNICAL FIELD

This disclosure relates to an exemplary apparatus and method of providing a vehicle body-in-white structure that includes overmolding of a plastic or composite material to form a ribbed structure on both outboard and inboard sides of the body-in-white structure to provide reinforcing and energy absorbing features.

BACKGROUND

Traditionally, body-in-white (BIW) panels are constructed from stamped and welded sheet metal panels. The BIW panels are configured to absorb a significant amount of impact energy during impact events. The architectures of these panels limit the way impact loads are managed during an impact event, and limit the load resistance once a small area on the stamped panel reaches a yield limit where bucking/folding occurs.

SUMMARY

An apparatus according to an exemplary aspect of the present disclosure includes, among other things, a body-in-white member having an inboard side and an outboard side, a reinforcing structure molded on the inboard side, and an energy absorbing structure molded on the outboard side.

In a further non-limiting embodiment of the foregoing apparatus, the body-in-white member comprises a sheet metal stamping.

In a further non-limiting embodiment of any of the foregoing apparatus, the reinforcing structure comprises material that is overmolded on the inboard side of the sheet metal stamping and includes a plurality of reinforcing members.

In a further non-limiting embodiment of any of the foregoing apparatus, the energy absorbing structure comprises material that is overmolded on the outboard side of the sheet metal stamping and includes a plurality of energy absorbing members.

In a further non-limiting embodiment of any of the foregoing apparatus, the reinforcing structure comprises material that is overmolded on the inboard side of the sheet metal stamping and includes a plurality of reinforcing members, and wherein the energy absorbing structure comprises material that is overmolded on the outboard side of the sheet metal stamping and includes a plurality of energy absorbing members.

In a further non-limiting embodiment of any of the foregoing apparatus, the plurality of reinforcing members and the plurality of energy absorbing members include one or more of straight ribs, honeycombs, cellular ribs, and/or bionic ribs.

In a further non-limiting embodiment of any of the foregoing apparatus, the material that is overmolded on the inboard and outboard sides comprises a plastic or composite material.

In a further non-limiting embodiment of any of the foregoing apparatus, the body-in-white member comprises a vehicle pillar.

In a further non-limiting embodiment of any of the foregoing apparatus, the sheet metal stamping comprises a monolithic blank.

In a further non-limiting embodiment of any of the foregoing apparatus, the pillar has an upper end and a lower end, and wherein the reinforcing structure comprises a ribbed structure that is located at the upper end and is enclosed between the inboard side of the body-in-white member and an inner pillar member, and wherein the energy absorbing structure comprises a ribbed structure that is located at the lower end and is enclosed between the outboard side of the body-in-white member and a body outer panel.

An apparatus according to another exemplary aspect of the present disclosure includes, among other things, a body outer panel, a pillar body having an inboard side and an outboard side separated from an inner surface of the body outer panel by a gap, a reinforcing structure molded on the inboard side, and an energy absorbing structure molded on the outboard side to reduce a size of the gap.

In a further non-limiting embodiment of any of the foregoing apparatus, the reinforcing structure and the energy absorbing structure are comprised of a plastic and/or composite material.

In a further non-limiting embodiment of any of the foregoing apparatus, the pillar body comprises a sheet metal structure.

In a further non-limiting embodiment of any of the foregoing apparatus, the reinforcing structure and the energy absorbing structure are comprised of straight ribs, honeycombs, cellular ribs, and/or bionic ribs.

A method according to another exemplary aspect of the present disclosure includes providing a body-in-white member having an inboard side and an outboard side, molding a reinforcing structure on the inboard side, and molding an energy absorbing structure on the outboard side.

In a further non-limiting embodiment of the foregoing method, the method includes forming flow holes in the body-in-white member to allow molding material to flow through the body-in-white member to reach both the inboard and outboard sides.

In a further non-limiting embodiment of any of the foregoing methods, the method includes forming the body-in-white member as a sheet metal panel and overmolding a plastic or composite material on both the inboard and outboard sides in a single shot injection molding process to form the reinforcing and energy absorbing structures.

In a further non-limiting embodiment of any of the foregoing methods, the body-in-white member comprises a pillar.

In a further non-limiting embodiment of any of the foregoing methods, the pillar has an upper end and a lower end, and the method includes forming the reinforcing structure as a ribbed structure that is located at the upper end and is configured to face an inner pillar member, and forming the energy absorbing structure as a ribbed structure that is located at the lower end and is configured to absorb impact energy due to an external force applied to a body outer panel that faces the outboard side of the pillar.

In a further non-limiting embodiment of any of the foregoing methods, the method includes forming the reinforcing structure and the energy absorbing structure as straight ribs, honeycombs, cellular ribs, and/or bionic ribs.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary apparatus and methods of providing a body-in-white (BIW) member having an inboard side and an outboard side, a reinforcing structure molded on the inboard side, and an energy absorbing structure molded on the outboard side. In one disclosed example, the apparatus and method provides the BIW structure by overmolding a plastic or composite material to form a ribbed structure on both the outboard and the inboard sides of the BIW structure in a single shot injection molding process to provide the reinforcing and energy absorbing structures.

Figure 1:
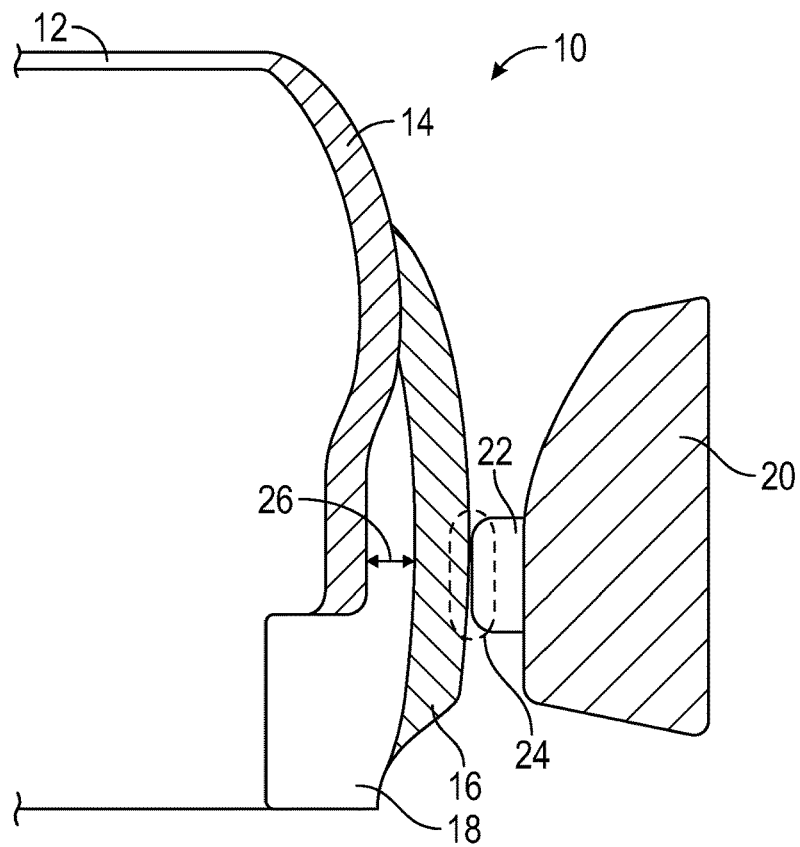
FIG. 1 illustrates a section view showing a side impact event.
Figure 2A:
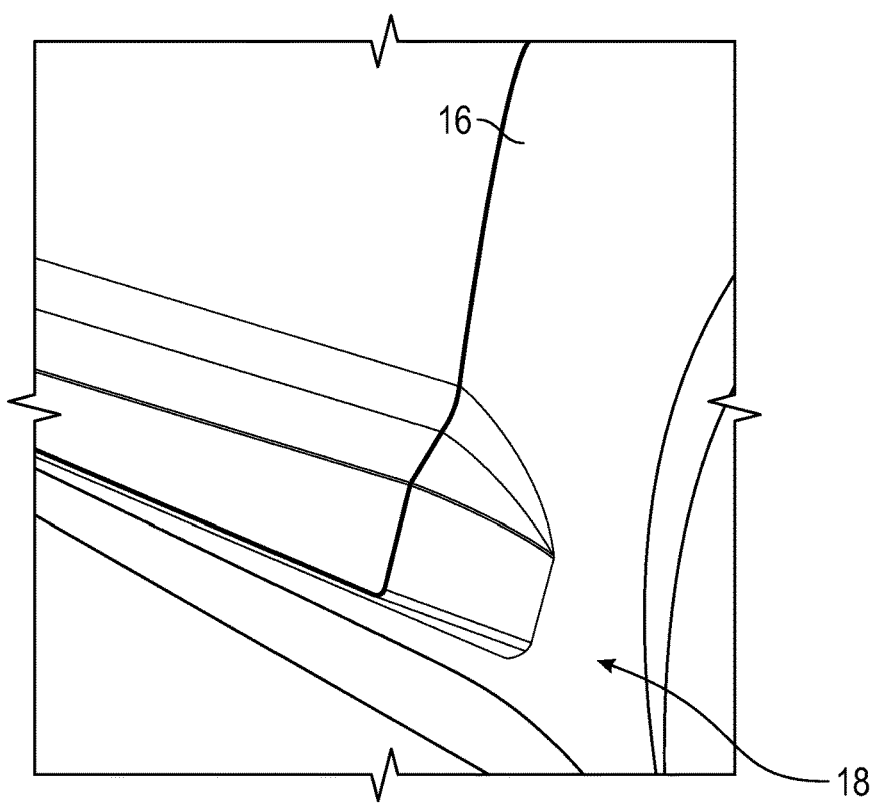
FIG. 2A is a perspective view of a vehicle body outer panel near a bottom of a B-pillar.
Figure 2B:
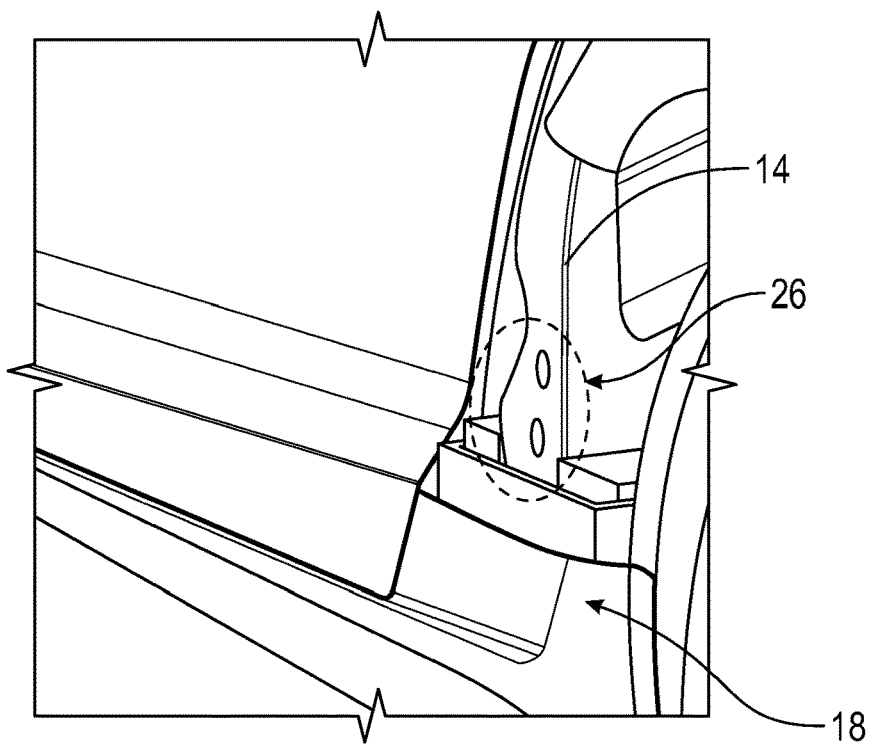
FIG. 2B is a view similar to FIG. 2A but with the body outer panel hidden to shown a gap between the body side outer panel and the B-pillar.

FIGS. 1 and 2A-B illustrate a vehicle 10 having a top 12, a B-pillar outer panel 14, a body side outer panel 16, and a rocker outer panel 18. An impactor 20 with an extending portion 22 provides a point of contact 24 during a side impact event as shown in FIG. 1. There is an open space or gap 26 between the B-pillar outer panel 14 and the body side outer panel 16. The B-pillar outer panel 14 is generally made of high strength steel and is the primary structural component managing energy during a side impact event. The impactor 20 initially contacts the body side outer panel 16, which is generally made of a lower strength steel, and then makes contact with the B-pillar outer panel 14 as shown in FIGS. 1 and 2A-B.

Figure 3:
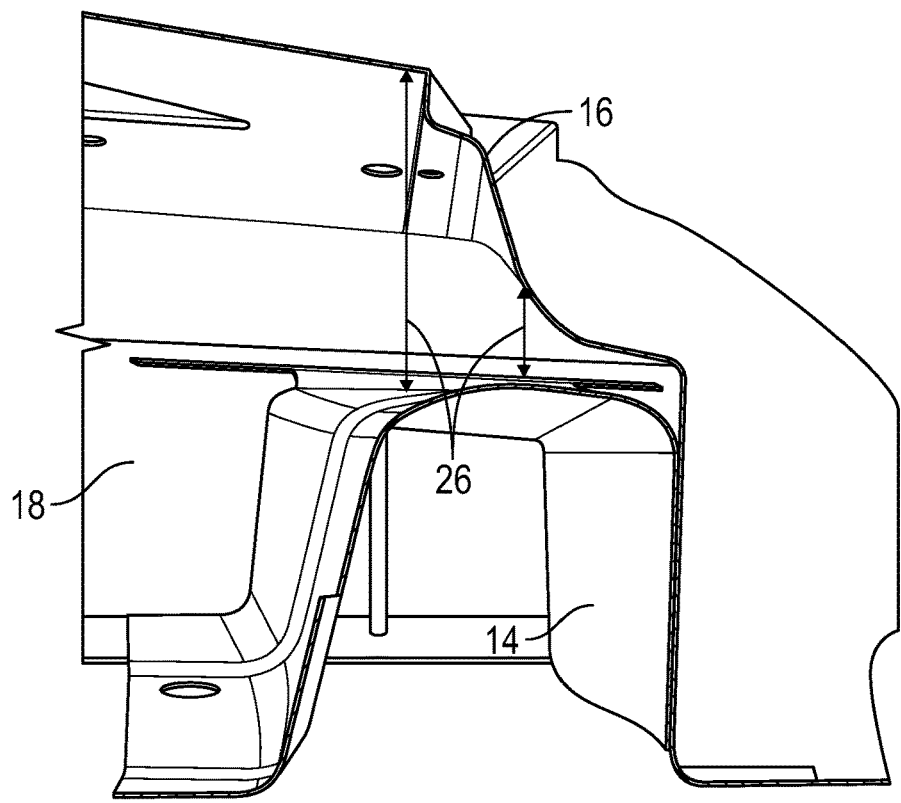
FIG. 3 is a section top view showing the gap between the body side outer panel and the B-pillar.

FIG. 3 more clearly shows the gap 26 that is between the outer surface of the B-pillar outer panel 14 and the inner surface of the body side outer panel 16. The gap 26 varies in size and follows the contour of the surfaces. This gap 26 exists at a lower half of the B-pillar outer panel 14 (FIG. 2B) because of the limitation in the design of the structural stampings due to the formability of the material, i.e. there is a limitation to a draw depth of the section of the B-pillar outer panel 14, in combination with the need to meet other requirements such as design and styling as required for the body side outer panel 16, and to meet packaging requirements of the body side.

Reducing the gap 26 between the B-pillar outer panel 14 and body side outer panel 16 can provide for improved management of energy transfer at a vehicle side that experiences an impact. By moving a contact surface of the pillar outer panel 14 further outboard to reduce the gap 26 will allow for earlier engagement of the B-pillar outer panel 14 with the impactor 20 during side impact events to absorb the load and to transfer the absorbed load in a desired load path.

Figure 4:
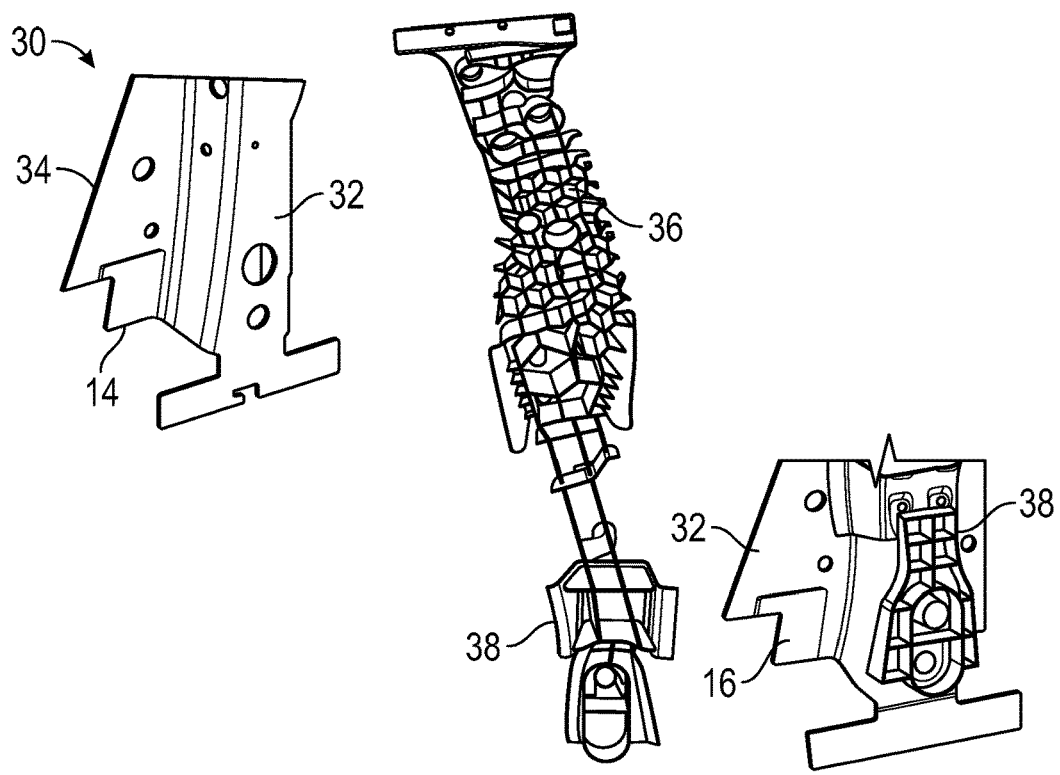
FIG. 4 is an exploded view of a bottom portion of an outer pillar metal panel and reinforcing and energy absorbing ribbed structures.

The section of the B-pillar outer panel 14 cannot be moved further outward due to the limitations to draw depth of the section made from hot or cold formed high strength materials with low ductility. The subject disclosure provides a BIW member 30, e.g. a pillar outer panel 14, having an inboard side 32 and an outboard side 34 (FIG. 4), and which includes a reinforcing structure 36 molded on the inboard side 32 and an energy absorbing structure 38 molded on the outboard side 34.

Figure 5:
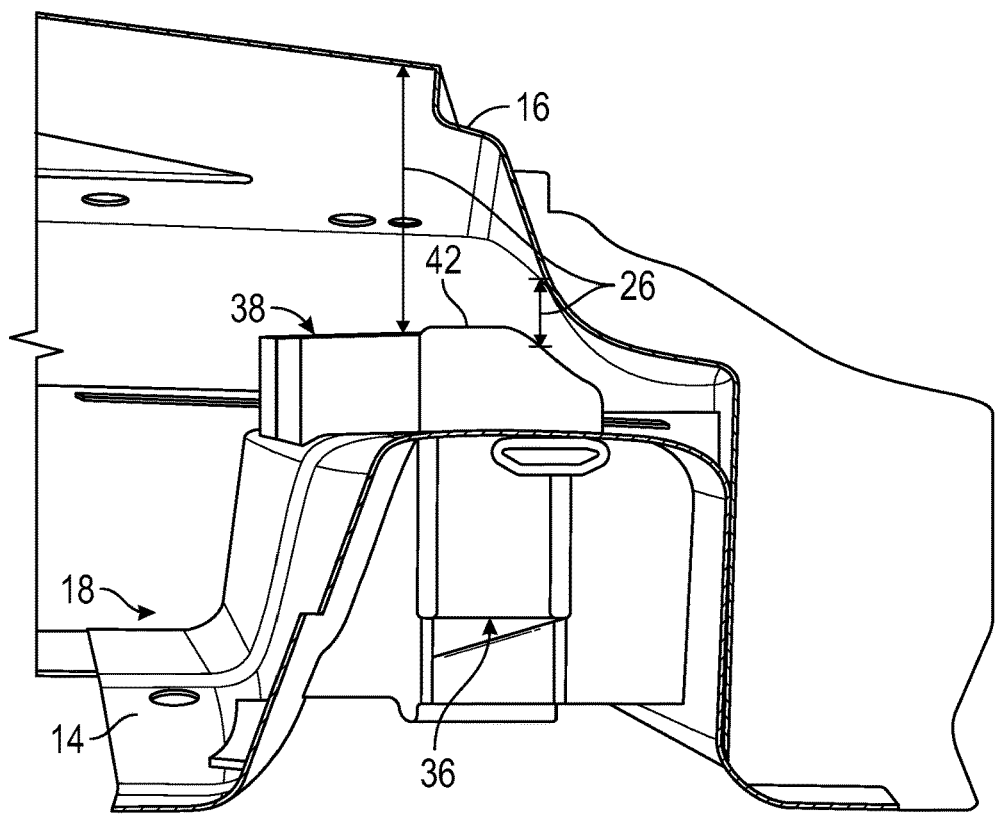
FIG. 5 is a section top view showing a reduced gap between the body side outer panel and the B-pillar due to the inclusion of the energy absorbing ribbed structure on the outboard surface of the B-pillar outer.
Figure 6:
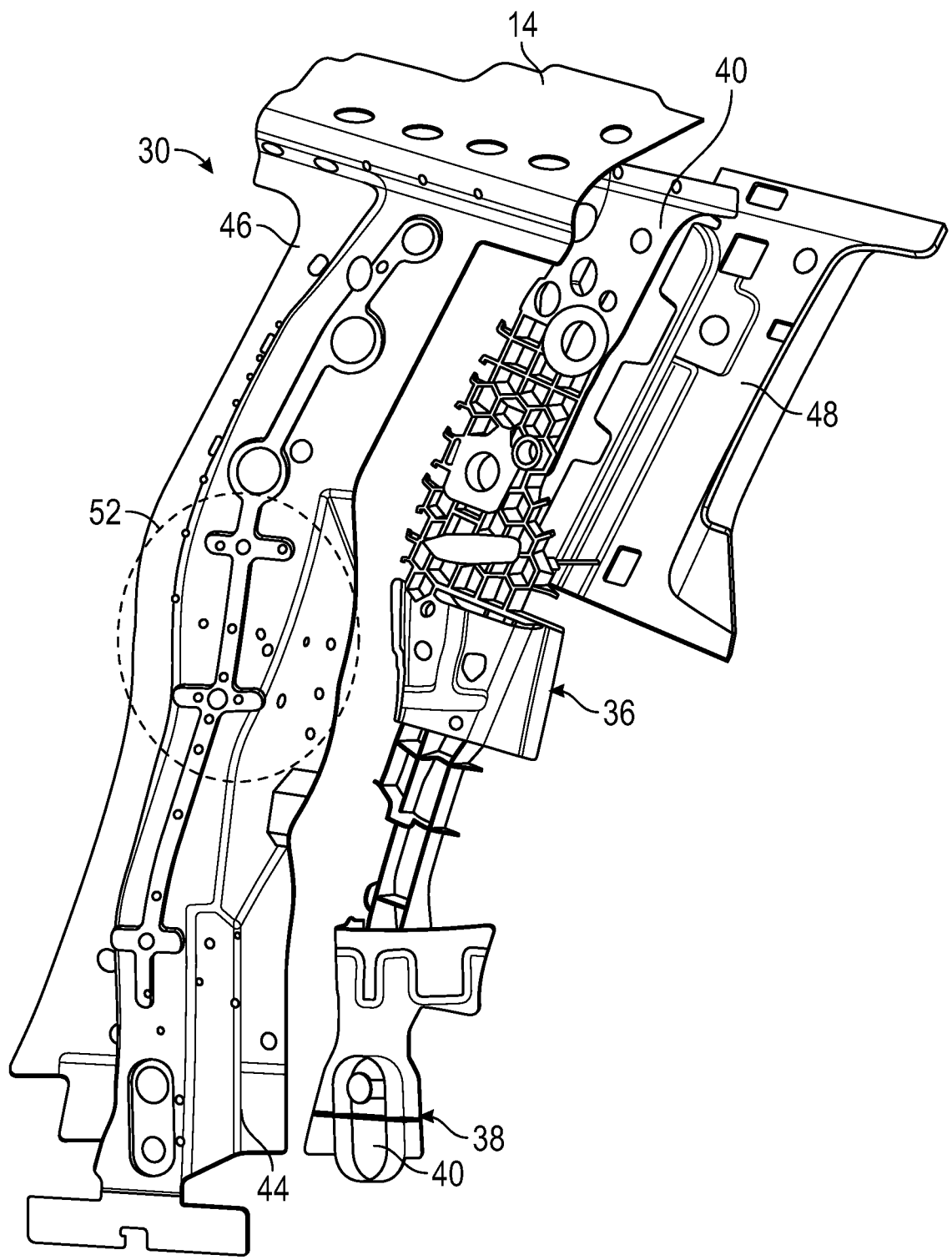
FIG. 6 is an exploded view of the outer pillar metal panel, the reinforcing and energy absorbing ribbed structures, and an inner pillar panel.
Figure 7:
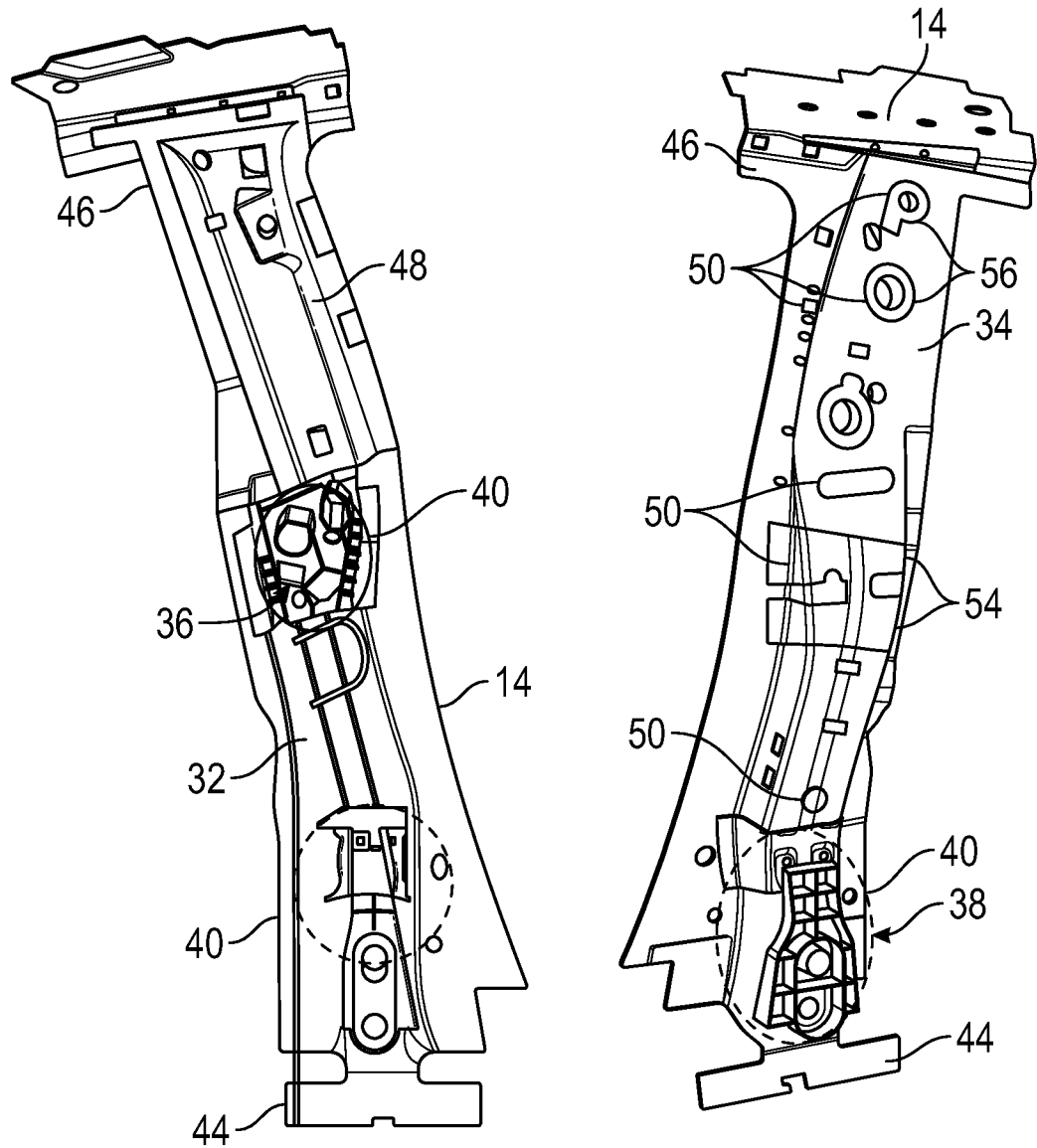
FIG. 7 is an iso view of the pillar panel assembly including the outer and inner sheet metal components, as well as the overmolded energy absorbing ribbed structure.
Figure 8:
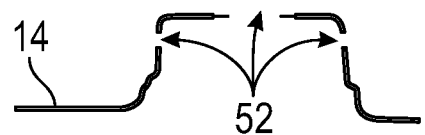
FIG. 8 is a top view of a section of a sheet metal stamping for the B-pillar.

The BIW reinforcing structure 36 on the inboard side 32 provides local stiffening of the pillar. The energy absorbing structure 38 on the outboard side 34 reduces the size of the gap 26 between the B-pillar outer panel 14 and body side outer panel 16 as shown in FIG. 5. The subject disclosure overmolds composite or plastic material with a rib structure 40 (straight, honeycomb core, cellular, and/or bionic) onto the outboard 34 and inboard 32 sides of the sheet metal structure as shown in FIGS. 6-7. The rib structure 40 on the outboard side 34 provides a B-pillar outboard surface 42 that is moved further outboard (FIG. 5) as desired to at least partially fill the open area between the body side outer panel 16 and B-pillar outer panel 14. This allows for earlier engagement of the impactor 20 with the BIW structure to absorb an impact load and to better control energy transfer of the absorbed load in the desired load path during the side impact events.

The plastic rib structures 40 act on the outboard side 34 as the first contact, and are the primary structural component managing energy. This allows the metal section of the B-pillar outer panel 14 to maintain its cross-sectional properties throughout the loading cycle thus effectively transferring the absorbed loads that may buckle the stamping. The energy absorbing structure 38 absorbs the loads within the section by averting or delaying the buckling of the base sheet metal, thus efficiently transferring the impact load upward to a center of the B-pillar outer panel 14 along the desired load path. Additionally, the combination of the reinforcing structure 36 and the energy absorbing structure 38 provides the required stiffness for the BIW section, which enables down grading and gauging of the base sheet metal stampings while still maintaining the required performance levels.

The rib structure 40 for the energy absorbing structure 38 is located at a bottom 44 of the B-pillar outer panel 14 as shown in FIG. 6. The rib structure 40 for the reinforcing structure 36 on the inboard side 32 is primarily located near a top 46 of the B-pillar outer panel 14. A B-pillar inner panel 48 is fit over this rib structure 40 on the inboard side 32 as shown in FIG. 7. This disclosed embodiment thus provides overmolding composite or plastic material on both the outboard 34 and inboard 32 sides of the metal B-pillar outer panel 14 in a single shot injection molding process, which results in weight reduction and allowing for a down gauge, down grade, and material cost reduction. Additionally, the disclosed embodiment has a reduced part cost while still maintaining desired performance, noise-vibration-harshness (NVH), and stiffness requirements.

In the example shown in FIGS. 6-7, there are mechanical interlocks 50 that are also molded onto the metal B-pillar outer panel 14. Holes 52 on the metal B-pillar outer panel 14 shown in FIG. 6 allow the plastic to flow on either side 32, 34 creating one or more plastic bands 54 and mechanical interlocks 56 on the outboard side 34, which help to hold the rib structure 40 that is molded on the inboard side 32 in position. This enables both the structures, i.e. the metal B-pillar outer panel 14 and the overmolded plastic reinforcing 36 and energy absorbing 38 structures to perform as one part. Further, the overmolding on both the inboard and outboard sides is made in a single shot by utilizing the through holes 52, which avoids having to separately mold each side of the part.

Figure 9:
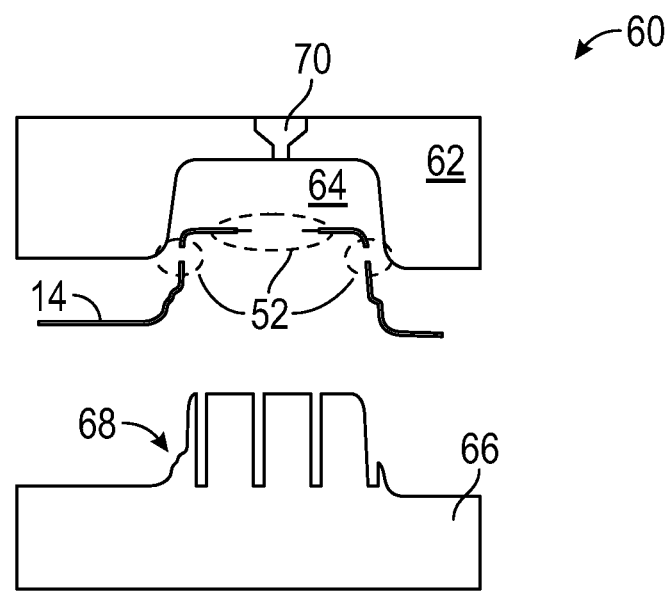
FIG. 9 is a schematic view of the sheet metal stamping of FIG. 8 being loaded into a mold.
Figure 10:
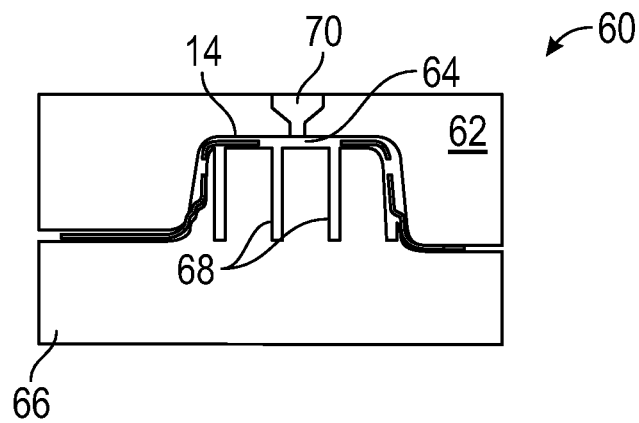
FIG. 10 is a view similar to FIG. 9 but showing the mold in a closed position.
Figure 11:
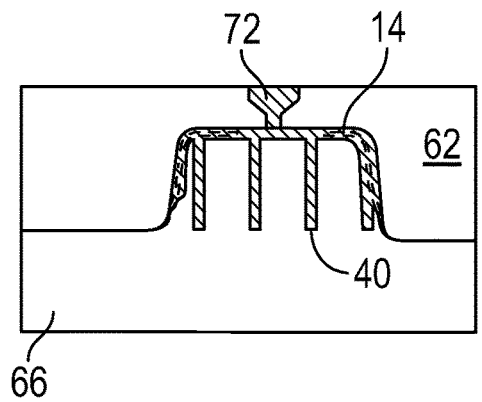
FIG. 11 is a view similar to FIG. 10 but showing material being injected into the mold.

Overmolding is the process of adding a second/additional layer of material over an already existing part. An example of this process is shown in FIGS. 8-12. A stamped/molded part, e.g. the B-pillar outer panel 14 (FIG. 8), is transferred and loaded into an injection molding die 60 as shown in FIG. 9. The die 60 includes an upper portion 62 with a cavity 64 that receives the panel 14 and a core 66 that is shaped as indicated at 68 to define the ribbed structures 40. The core 66 is positioned within the cavity 64 and the die 60 is closed as shown in FIG. 10.

Figure 12:
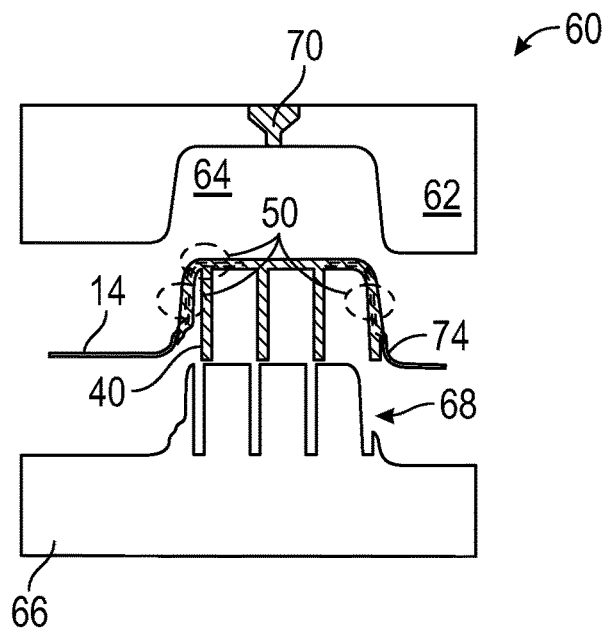
FIG. 12 is a view similar to FIG. 11 but showing the molded part being unloaded from the mold.
Figure 13:
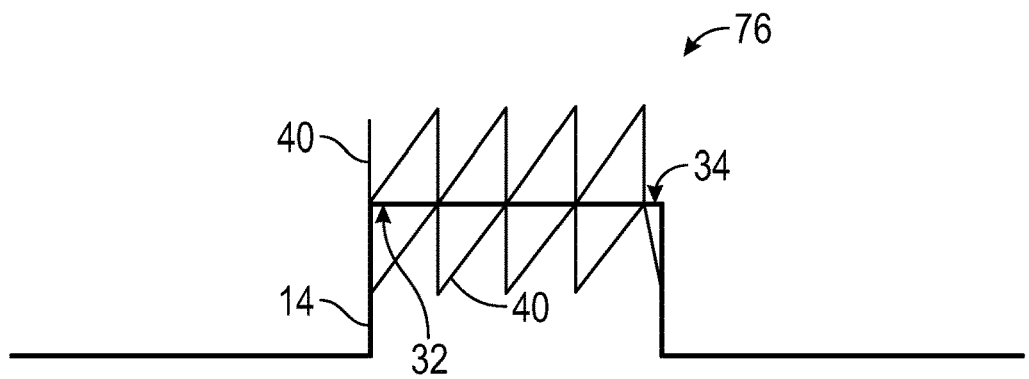
FIG. 13 shows a molded part similar to that of FIG. 12 but with ribs on both sides of the part.

The upper portion 62 includes an inlet 70 through which composite or plastic material is introduced into the cavity 64. In one example, a single shot of the material 72, e.g. thermoplastic material, is then molded over the metal material of the panel 14 to create the final molded part 74. The holes 52 on the metal panel 14 allow the molten plastic to flow on either side of the metal panel 14 to form the mechanical interlocks 50, with the sheet metal making the structure as one piece. Next, the die 60 is opened and the final molded part 74 is then removed as shown in FIG. 12. The overmold process ensures strong/tight mechanical bond/interlocks between the assembled inserts thus eliminating the use of adhesives or other joining processes (rivet, bolt, screw, etc.) to attain a higher buckling resistance and stiffness. FIG. 12 shows the final molded part 74 with the rib structure 40 on one side. FIG. 13 shows an example of a final molded part 76 with the rib structure 40 on both sides such as would be used with the disclosed panel 14.

The subject disclosure uses overmold technology to provide a BIW integrated panel where composite or plastic material that is molded onto both the outboard 34 and inboard 32 sides of the sheet metal pillar panel 14 is used to tailor the placement of reinforcing 36 and energy absorbing 38 structures at locations where they are most effective. The ribbed structures 40 (honeycomb cell/Rib/Bionic) of the reinforcing 36 and energy absorbing 38 structures serve as structural reinforcements and impact absorbers for side impact events. This allows for a weight and cost reduction for the B-pillar BIW structure. Further, the sheet metal body of the B-pillar outer panel 14 can be formed as a monolithic piece, as opposed to multiple pieces welded together, to further reduce cost.

The overmolding process that provides the rib structure as structural reinforcement for a metal panel can be used in a variety of BIW applications on areas that experience impact loads and need to have a certain stiffness based on the loading direction. Some example structures include floor/seat cross members, top bow, bumpers, A/B/C/D pillars, hinge pillar, rockers, door beams, etc.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An apparatus, comprising:
    a body-in-white member having an inboard side and an outboard side;
    a reinforcing structure molded on the inboard side; and
    an energy absorbing structure molded on the outboard side,
    wherein the reinforcing structure includes a first ribbed structure that is configured differently from a second ribbed structure of the energy absorbing structure.

2. The apparatus according to claim 1 wherein the body-in-white member comprises a sheet metal stamping.

3. The apparatus according to claim 2 wherein the reinforcing structure comprises material that is overmolded on the inboard side of the sheet metal stamping and includes a plurality of reinforcing members.

4. The apparatus according to claim 2 wherein the energy absorbing structure comprises material that is overmolded on the outboard side of the sheet metal stamping and includes a plurality of energy absorbing members.

5. The apparatus according to claim 2 wherein the reinforcing structure comprises material that is overmolded on the inboard side of the sheet metal stamping and includes a plurality of reinforcing members, and wherein the energy absorbing structure comprises material that is overmolded on the outboard side of the sheet metal stamping and includes a plurality of energy absorbing members.

6. The apparatus according to claim 5 wherein the plurality of reinforcing members and the plurality of energy absorbing members include one or more of straight ribs, honeycombs, cellular ribs, and/or bionic ribs.

7. The apparatus according to claim 5 wherein the material that is overmolded on the inboard and outboard sides comprises a plastic or composite material.

8. The apparatus according to claim 2 wherein the body-in-white member comprises a vehicle pillar, and further wherein the sheet metal stamping comprises a monolithic blank.

9. The apparatus according to claim 8 wherein the pillar has an upper end and a lower end, and wherein the first ribbed structure is located at the upper end but not the lower end and is enclosed between the inboard side of the body-in-white member and an inner pillar member, and wherein the second ribbed structure is located at the lower end but not the upper end and is enclosed between the outboard side of the body-in-white member and a body outer panel.

10. An apparatus comprising:
a vehicle rocker outer panel;
a vehicle body outer panel;
a vehicle pillar body having an inboard side and an outboard side separated from an inner surface of the vehicle body outer panel by a gap,
wherein the vehicle body outer panel is received in abutting contact with a portion of the outboard side of the vehicle pillar body and is further received in abutting contact with a portion of the vehicle rocker outer panel;
a reinforcing structure molded on the inboard side; and
an energy absorbing structure molded on the outboard side to reduce a size of the gap.

11. The apparatus according to claim 10 wherein the reinforcing structure and the energy absorbing structure are comprised of a plastic and/or composite material.

12. The apparatus according to claim 11 wherein the pillar body comprises a sheet metal structure, and further wherein the vehicle body outer panel comprises a lower strength material than that of the sheet metal structure.

13. The apparatus according to claim 11 wherein the reinforcing structure and the energy absorbing structure are comprised of straight ribs, honeycombs, cellular ribs, and/or bionic ribs.

14. A method comprising:
providing a body-in-white member having an inboard side and an outboard side;
molding a reinforcing structure on the inboard side; and
molding an energy absorbing structure on the outboard side,
wherein the reinforcing structure includes a first ribbed structure that is configured differently from a second ribbed structure of the energy absorbing structure.

15. The method according to claim 14 including forming flow holes in the body-in-white member to allow molding material to flow through the body-in-white member to reach both the inboard and outboard sides.

16. The method according to claim 14 including forming the body-in-white member as a sheet metal panel and including overmolding a plastic or composite material on both the inboard and outboard sides in a single shot injection molding process to form the reinforcing and energy absorbing structures, and further wherein the body-in-white member comprises a pillar.

17. The method according to claim 16 wherein the pillar has an upper end and a lower end, and wherein the first ribbed structure is located at the upper end but not the lower end and is configured to face an inner pillar member, and the second ribbed structure is located at the lower end but not the upper end and is configured to absorb impact energy due to an external force applied to a body outer panel that faces the outboard side of the pillar.

18. The method according to claim 16 including forming the reinforcing structure and the energy absorbing structure as straight ribs, honeycombs, cellular ribs, and/or bionic ribs.

19. The apparatus according to claim 1 wherein the first ribbed structure is asymmetric relative to the second ribbed structure about a vertical axis of the body-in-white member.

20. The apparatus according to claim 1 wherein the first ribbed structure and the second ribbed structure each include honeycomb ribs and/or cellular ribs.

* * * * *